(12) United States Patent
Huang et al.

(10) Patent No.: US 11,092,838 B2
(45) Date of Patent: Aug. 17, 2021

(54) DISPLAY PANEL

(71) Applicant: AU Optronics Corporation, Hsin-Chu (TW)

(72) Inventors: Liang-Yin Huang, Hsin-Chu (TW); Chih-Hao Chen, Hsin-Chu (TW); Min-Zi Hong, Hsin-Chu (TW); Seok-Lyul Lee, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/840,494

(22) Filed: Apr. 6, 2020

(65) Prior Publication Data

US 2021/0033915 A1   Feb. 4, 2021

(30) Foreign Application Priority Data

Aug. 2, 2019 (TW) .................. 108127621

(51) Int. Cl.
*G02F 1/1334* (2006.01)
*G02F 1/1333* (2006.01)
*G02F 1/1339* (2006.01)
*G02F 1/1343* (2006.01)
*C09K 19/32* (2006.01)
*C09K 19/54* (2006.01)
*G02F 1/00* (2006.01)
*G02F 1/1335* (2006.01)

(52) U.S. Cl.
CPC ........ *G02F 1/1334* (2013.01); *G02F 1/13394* (2013.01); *G02F 1/133305* (2013.01); *G02F 1/133377* (2013.01); *G02F 1/134309* (2013.01); *C09K 19/32* (2013.01); *C09K 19/544* (2013.01); *G02F 1/0063* (2013.01); *G02F 1/133514* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,530,567 A | * | 6/1996 | Takei | G02F 1/1334 349/155 |
| 7,145,626 B2 | * | 12/2006 | Miller | G02F 1/167 349/166 |
| 2004/0167027 A1 | * | 8/2004 | Smith | B41M 5/41 503/227 |
| 2020/0348549 A1 | * | 11/2020 | Yamada | B32B 17/10036 |

FOREIGN PATENT DOCUMENTS

| | | |
|---|---|---|
| CN | 103217830 A | 7/2013 |
| JP | H05216020 A | 8/1993 |

* cited by examiner

*Primary Examiner* — Dung T Nguyen
(74) *Attorney, Agent, or Firm* — McClure, Qualey & Rodack, LLP (57) ABSTRACT

A display panel includes a first substrate, an electrode layer, and a display medium layer. The electrode layer is disposed on the first substrate. The display medium layer is disposed on the electrode layer and includes a filler and liquid crystal capsules. The liquid crystal capsules are distributed in the filler, and the filler has a birefringence difference Δn in a range from 0.02 to 0.175.

7 Claims, 9 Drawing Sheets

DISPLAY PANEL

CROSS-REFERENCE TO RELATED APPLICATION

This application claims priority to Taiwan Application Serial Number 108127621, filed Aug. 2, 2019, which is herein incorporated by reference in its entirety.

BACKGROUND

Technical Field

The present disclosure relates to a display panel.

Description of Related Art

Among various electronic products of household electrical appliances, liquid crystal display devices applied with thin-film transistors (TFTs) have been widely used. The thin-film transistor type liquid crystal display device is mainly composed of a thin-film transistor array substrate, a color filter array substrate and a liquid crystal layer, in which the thin-film transistor array includes a plurality of thin-film transistors arranged in array, and each of the thin-film transistors is provided with a pixel electrode correspondingly.

When the pixel electrode is driven through the thin-film transistor, the pixel electrode turns liquid crystal molecules in the liquid crystal layer, thereby controlling the optical chirality of the liquid crystal layer for the light beam. In this regard, the ingredients of the liquid crystal layer affects the display quality of the liquid crystal display. Therefore, how to enhance the display quality of the liquid crystal display by adjusting the ingredients of the liquid crystal layer has become one of the important research and development direction in the field.

SUMMARY

An embodiment of the present disclosure is to provide a display panel, which includes a first substrate, an electrode layer and a display medium layer. The electrode layer is disposed on the first substrate. The display medium layer is disposed on the electrode layer, and includes a filler and a plurality of liquid crystal capsules, in which the liquid crystal capsules are distributed in the filler, and the filler has a birefringence difference Δn in a range from 0.02 to 0.175.

In some embodiments, the display panel further includes a second substrate. The second substrate is disposed on the display medium layer, and each of the first substrate and the second substrate is flexible.

In some embodiments, the display panel further includes a plurality of spacers disposed between the first substrate and the second substrate, in which the second substrate is formed by curing at least one monomer added into the display medium layer, and at least a portion of the cured second substrate is disposed between the spacers.

In some embodiments, the electrode layer includes a plurality of stereoscopic electrodes. Each of the stereoscopic electrodes includes a protruding structure and an electrode pad, in which the protruding structure protrudes from the first substrate toward the display medium layer, the electrode pad is disposed on the protruding structure, and a thickness of the electrode pad is in a range from 300 nm to 700 nm.

In some embodiments, each of the liquid crystal capsules includes a capsule film and at least one liquid crystal molecule, and the capsule film covers the liquid crystal molecule, in which the liquid crystal molecule is a rod-shaped structure or a disc-shaped structure.

In some embodiments, the liquid crystal molecule is the disc-shaped structure, and the capsule film is an optical thermal adhesive formed of at least one monomer having a stick-shaped structure.

In some embodiments, the first substrate includes a transparent substrate, an array layer, and a color filter layer, the transparent substrate is flexible, and the array layer is disposed between the transparent substrate and the color filter layer.

In some embodiments, a short axial refractive index $n_\perp$ of the filler is in a range from 1.45 to 1.5, and a long axial refractive index $n_\parallel$ is in a range from 1.5 to 1.55.

An embodiment of the present disclosure is to provide a display panel, which includes a first substrate, an electrode layer and a display medium layer. The electrode layer is disposed on the first substrate. The display medium layer is disposed on the electrode layer, and includes a filler and a plurality of liquid crystal capsules, in which the liquid crystal capsules are distributed in the filler, and a material of the filler at least includes at least one 1,4-cyclohexylene derivative, at least one 1,4-phenyl derivative, at least one 1,3-indenyl derivative or combinations thereof, in which the chemical formula of 1,4-cyclohexylene derivative is the chemical formula of 1,4-phenyl derivative is and the chemical formula of 1,3-indenyl derivative is In some embodiments, the display medium layer further includes a surfactant uniformly mixed and distributed in the filler.

According to the aforementioned configuration, the birefringence difference Δn of the filler is implemented to be in a range from 0.02 to 0.175 by adjusting the material of the filler. As a result, the birefringence difference Δn of the filler can be matched with the refractive index of the electrode layer, thereby avoiding light leakage of the display panel in a dark state so as to increase contrast of the display panel.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other words, in some embodiments of the present invention, these practical details are not necessary. Moreover, some well-known structures and devices are schematically depicted in order to simplify the drawings.

In the present disclosure, it is comprehensible that terms such as first, second, and third are used to describe various components or areas. The terms are used for identifying single component or area. Therefore, the following first component or area may also be called as the second component or area without departing from the intention of the present disclosure. "Approximately" or "substantially" used herein includes an average value within an acceptable deviation range and the described value. For example, "approximately" or "substantially" may represent being within one or more standard deviations of the described value, or within ±30%, ±20%, ±10%, or ±5%.

Figure 1A:
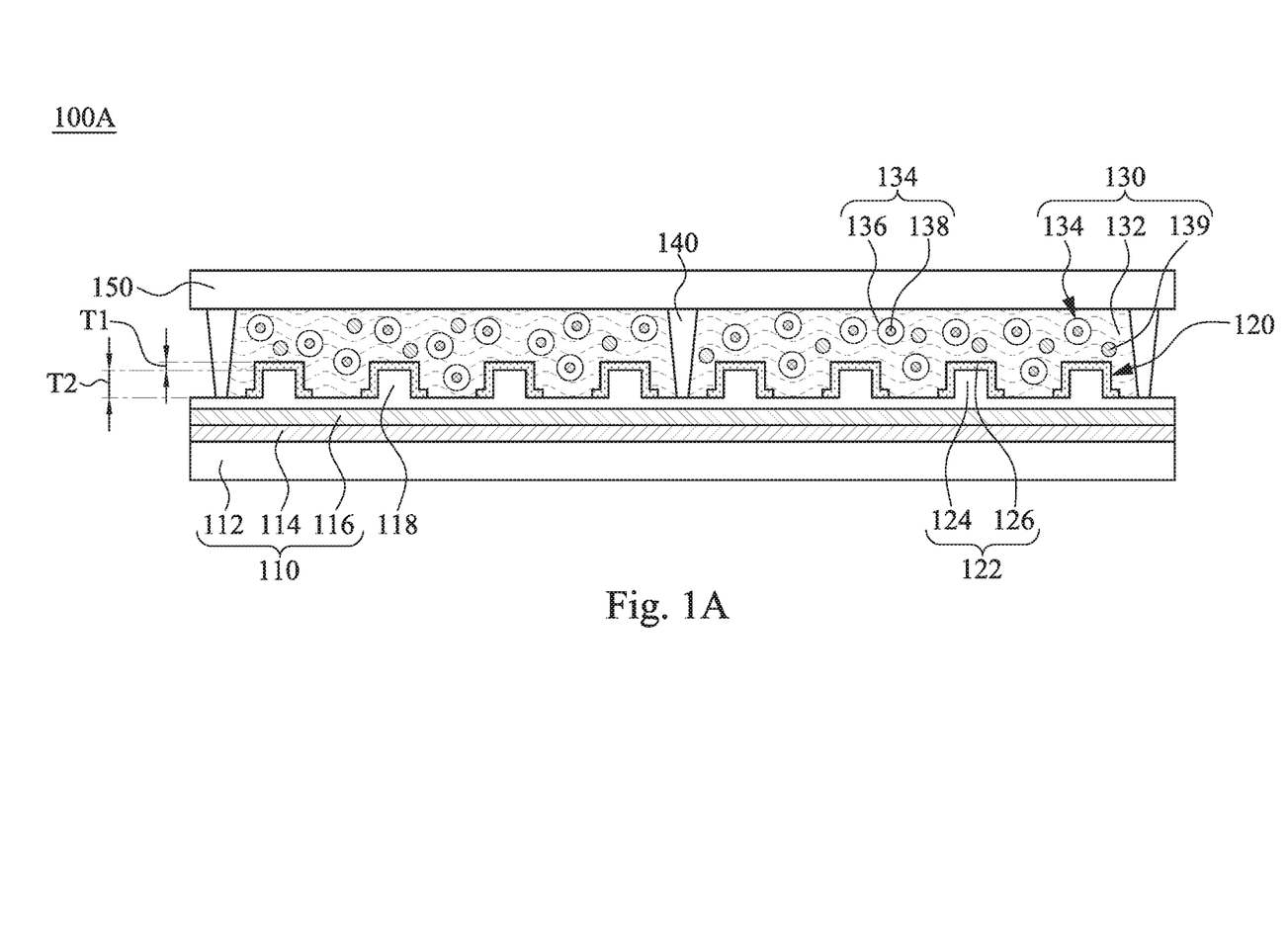
FIG. 1A is a schematic side view of a display panel according to a first embodiment of the present disclosure.

Reference is made to FIG. 1A. FIG. 1A is a schematic side view of a display panel 100A according to a first embodiment of the present disclosure. The display panel 100A includes a first substrate 110, an electrode layer 120, a display medium layer 130, spacers 140, and a second substrate 150.

The first substrate 110 may include a transparent substrate 112, an array layer 114, and a color filter layer 116, in which the array layer 114 and the color filter layer 116 are sequentially formed on the transparent substrate 112, that is, the array layer 114 is located between the transparent substrate 112 and the color filter layer 116.

The transparent substrate 112 is flexible. For example, the transparent substrate 112 may be a polyimide (PI) substrate. The array layer 114 may include an array arranged by a plurality of thin-film transistors (not shown). The color filter layer 116 may include a light-shielding layer (not shown) and a plurality of color resist layers (not shown) with different colors, such as a red color resist layer, a green color resist layer, and a blue color resist layer, in which the light-shielding layer may be formed as a black matrix, thereby defining the forming position of each of the color resist layers. With this configuration, the configuration of color filter on array (COA) can be implemented on the first substrate 110 with a plurality of pixel areas therein.

In addition, the first substrate 110 may further include a protective layer 118, in which the protective layer 118 is disposed on the color filter layer 116, so as to prevent an upper surface of the color filter layer 116 from being damaged. The protective layer 118 may have contact holes (not shown) in conjunction with the color resist layer of the color filter layer 116, such that the thin-film transistors of the array layer 114 can be connected to layers formed on the protective layer 118 through the contact holes.

The electrode layer 120 is disposed on the protective layer 118 of the first substrate 110, and the display medium layer 130 is disposed on the electrode layer 120. The electrode layer 120 may include a plurality of steroscopic electrodes 122, and each of the stereoscopic electrodes 122 includes a protruding structure 124 and an electrode pad 126. The protruding structure 124 can protrude from the first substrate 110 toward the display medium layer 130. In some embodiments, the protruding structure 124 and the protective layer 118 of the first substrate 110 can be formed in the same mask process, for example, a photoresist layer can first be formed on the color filter layer 116, and then an exposure is performed on the photoresist layer by using a half-tone mask, thereby forming the protruding structure 124 and the protective layer 118 which are connected to each other after lithography. However, the present disclosure is not limited in this regard. In other embodiments, the protruding structure 124 and the protective layer 118 can be formed sequentially. The electrode pad 126 is disposed on the protruding structure 124 and is conformal to the protruding appearance of the protruding structure 124. The electrode pad 126 can be connected to the thin-film transistor of the array layer 114 through the contact hole, such that the electrode pad 126 can be driven by the thin-film transistor of the array layer 114. In other words, the stereoscopic electrode 122 can be used as a pixel electrode, which can generate an electric field by coupling and change the optical chirality of the display medium layer 130.

In some embodiments, a thickness T1 of the electrode pad 126 may be in a range from 300 nm to 700 nm. When a material of the electrode pad 126 includes metal, the electrode pad 126 having such a thickness may have a refractive index. For example, when the material of the electrode pad 126 is silver, the electrode pad 126 has a refractive index in a range from 0.1 to 0.2. In addition, the material of the electrode pad 126 may also include a transparent conductive material, such as indium tin oxide, indium zinc oxide, zinc oxide, indium gallium zinc oxide, or other suitable materials. With this configuration, the optical properties of the electrode pad 126 can be matched with the optical properties of the display medium layer 130, which will be discussed in the following descriptions.

In some embodiments, a thickness T2 of the protruding structure 124 may be in a range from 1 μm to 4 μm, or in a range from 1 μm to 3 μm. Since a shape of the protruding structure 124 is related to the electrical field lines coupled by the electrode pad 126, the electrical field lines coupled by the electrode pad 126 can be adjusted by adjusting the thickness T2 of the protruding structure 124 in order to reduce operating voltage for driving the electrode pad 126. In addition, for each pair of adjacent electrode pads 126, different voltages, such as a positive voltage and a negative voltage, can be applied thereto when the image is displayed on the display panel 100A.

The protruding shape of the stereoscopic electrode 122 in FIG. 1A can be presented as a plurality of strip-shaped patterns in a top viewing angle (i.e., when the display panel 100A is viewed from the top), and the strip-shaped patterns may have large or small angles therebetween in different directions. For example, references are made to FIG. 1B, FIG. 1C, and FIG. 1D, which are schematic top views of the stereoscopic electrode 122 of FIG. 1A in different embodiments, respectively.

Figure 1B:
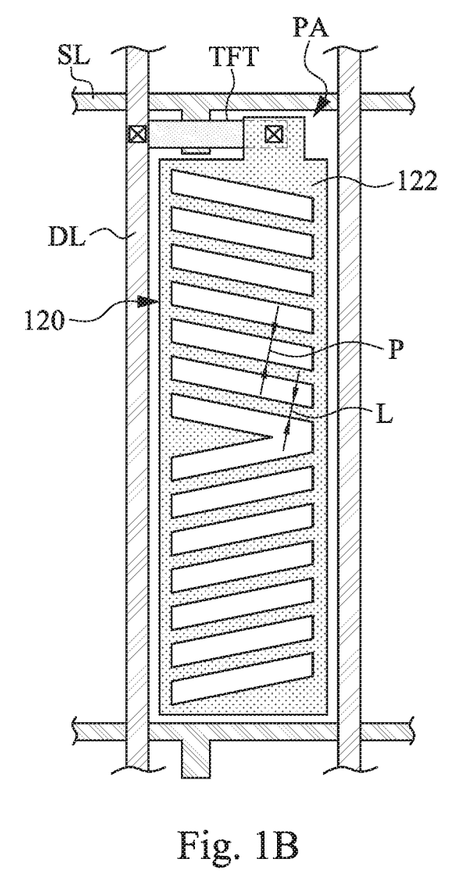
FIG. 1B to FIG. 1D are schematic top views of the stereoscopic electrode of FIG. 1A in different embodiments, respectively.
Figure 1C:
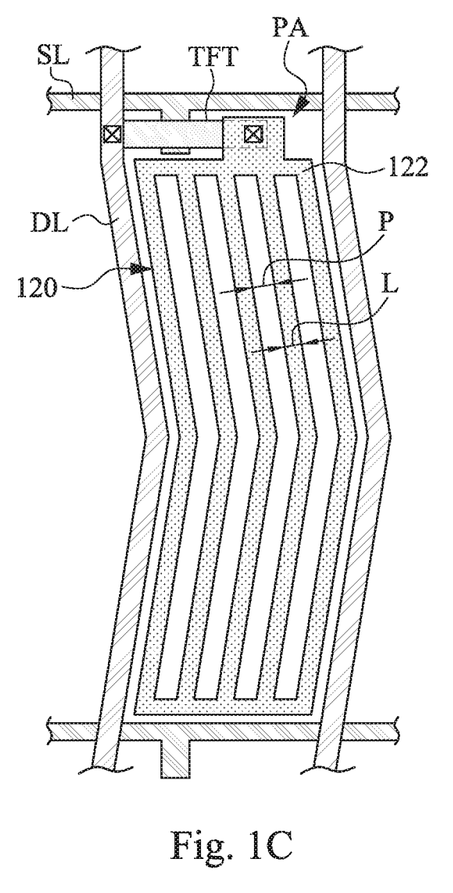
Figure 1D:
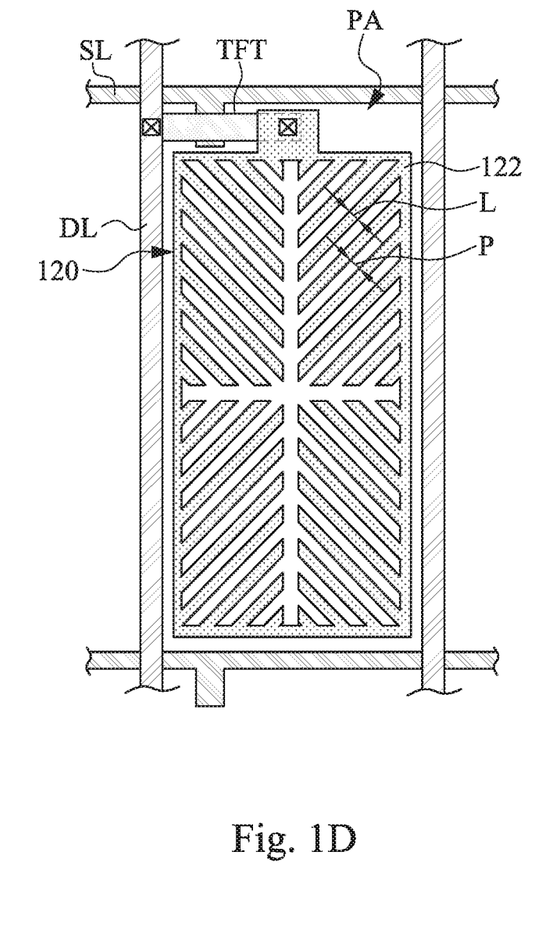

As shown in FIG. 1B, FIG. 1C, and FIG. 1D, the array layer 114 may further include scan lines SL, data lines DL, and a thin-film transistor TFT, in which the scan lines SL and the data lines DL can be interlaced to form a pixel area PA. The thin-film transistor TFT is disposed in the pixel area PA, in which the gate of the thin-film transistor TFT can be connected to the scan line SL, and the source of the thin-film transistor TFT can be connected to the data line DL. The stereoscopic electrode 122 may be located in the pixel area PA and electrically connected to the drain of the thin-film transistor TFT for being used as a pixel electrode. The protruding shape of the stereoscopic electrodes 122 can be designed as a strip-shaped pattern, a line width L of each of the stereoscopic electrode 122 can be in a range from 4 µm to 6 µm, and a line spacing P between each of the adjacent stereoscopic electrodes 122 may be in a range from 7 µm to 9 µm. The configuration of the stereoscopic electrode 122 in the pixel area PA is not limited in this regard. In other embodiments, the protruding shape of the stereoscopic electrode 122 may be designed to have a strip-shaped pattern of other styles.

Reference is made back to FIG. 1A. The display medium layer 130 may include a filler 132 and liquid crystal capsules 134, in which the liquid crystal capsules 134 are uniformly mixed and distributed in the filler 132. In some embodiments, a filling thickness of the filler 132 may be in a range from 2 µm to 4 µm, or in a range from 2 µm to 3 µm, and a diameter of each of the liquid crystal capsules 134 may be in a range from 100 nm to 320 nm.

A birefringence difference Δn of the filler 132 may be in a range from 0.02 to 0.175. In this way, the birefringence difference Δn of the filler 132 can be matched with the refractive index of the electrode pad 126, thereby avoiding light leakage of the display panel 100A in a dark state so as to enhance contrast of the display panel 100A.

The filler 132 having such a birefringence difference Δn can be achieved by adjusting its material configuration. Specifically, a material of the filler 132 may at least include 1,4-cyclohexylene derivative, 1,4-phenyl derivative, 1,3-indenyl derivative, 4,4'-biphenyl derivative, or combinations thereof, in which the chemical formula of 1,4-cyclohexylene derivative is the chemical formula of 1,4-phenyl derivative is the chemical formula of 1,3-indenyl derivative is and the chemical formula of 4,4'-biphenyl derivative is

In this regard, the birefringence difference of 1,4-cyclohexylene derivative is in a range from 0.02 to 0.054, the birefringence difference of 1,4-phenyl derivative is in a range from 0.097 to 0.106, the birefringence difference of 1,3-indenyl derivative can be approximately 0.085, and the birefringence difference of 4,4'-biphenyl derivative can be approximately 0.175. Since the minimum birefringence difference among 1,4-cyclohexylene derivative, 1,4-phenyl derivative, 1,3-indenyl derivative, and 4,4'-biphenyl derivative can be approximately 0.02 and the maximum birefringence difference among them can be approximately 0.175, the birefringence difference Δn of the filler 132 can be adjusted to be in a range from 0.02 to 0.175 by adjusting the proportion of these materials in the filler 132. Furthermore, a short axial refractive index $n_\perp$ of the filler 132 can be adjusted to be in a range from 1.45 to 1.5, and a long axial refractive index $n_\parallel$ of the filler 132 can be adjusted to be in a range from 1.5 to 1.55. Alternatively, 4,4'-biphenyl derivative can be omitted, such that the birefringence difference Δn of the filler 132 can be adjusted to be in a range from 0.02 to 0.1. In addition, with this configuration, the filler 132 is a mixture.

However, the present disclosure is not limited in this regard. In other embodiments, other materials can also be mixed into the filler 132 to further adjust the birefringence difference Δn of the filler 132. For example, the material of the filler 132 may further include cyclohexylene derivative, of which the chemical formula is in which the terminal group "R" in the chemical formula may be hydrogen, halogen, an alkyl group having 1 to 20 carbon atoms or combinations thereof, the value "n" in the chemical formula may be an integer from 1 to 12, and the "B" in the chemical formula may be cycloalkanes or aromatic hydrocarbons.

In some embodiments, the material of the filler 132 may further include: 4-vinyl-4'-propyl-1,1'-bicyclohexane, in which the chemical formula is:

4-allyl-4'-propyl-1,1'-bicyclohexane, in which the chemical formula is:

4-tolyl-4'-vinyl-1,1'-bicyclohexane, in which the chemical formula is:

4-allyl-4'-tolyl-1,1'-bicyclohexane, in which the chemical formula is:

4-pentyl-4'-propyl-1,1'-bicyclohexane, in which the chemical formula is:

4,4'-dipentyl-1,1'-bicyclohexane, in which the chemical formula is:

4-hexyl-4'-pentyl-1,1'-bicyclohexane, in which the chemical formula is:

4-tolyl-4'-propyl-1,1'-bicyclohexane, in which the chemical formula is:

4-[ethyl(cyclopentyl)]-4'-[(trifluoromethoxy)phenyl]-1,1'-bicyclohexane, in which the chemical formula is:

4-heptyl-4'-hexyl-1,1'-bicyclohexane, in which the chemical formula is:

2-heptyl-5-(4-heptylcyclohexyl)tetrahydro-2H-pyran, in which the chemical formula is:

or combinations thereof. In some embodiments, the filler 132 may be composed of the above materials, in which the content of the 4-vinyl-4'-propyl-1,1'-bicyclohexane is 18.44%, the content of the 4-allyl-4'-propyl-1,1'-bicyclohexane is 9.31%, the content of the 4-tolyl-4'-vinyl-1,1'-bicyclohexane is 9.12%, the content of the 4-allyl-4'-tolyl-1,1'-bicyclohexane is 25.66%, the content of the 4-pentyl-4'-propyl-1,1'-bicyclohexane is 5.28%, the content of the 4,4'-dipentyl-1,1'-bicyclohexane is 4.86%, the content of the 4-hexyl-4'-pentyl-1,1'-bicyclohexane is 5.12%, the content of the 4-tolyl-4'-propyl-1,1'-bicyclohexane is 5.88%, the content of the 4-[ethyl(cyclopentyl)]-4'-[(trifluoromethoxy)phenyl]-1,1'-bicyclohexane is 6.18%, the content of the 4-heptyl-4'-hexyl-1,1'-bicyclohexane is 5.30%, and the content of the 2-heptyl-5-(4-heptylcyclohexyl)tetrahydro-2H-pyran is 4.86%.

In the condition that the filler 132 is formed by adjusting the proportion of the aforementioned materials, since the aforementioned materials are oily substance, they are less likely to react with moisture. For example, the filler 132 may have a low water-absorbing characteristic, thereby preventing the filler 132 from absorbing the moisture in the environment, which affects the reliability of the display panel 100A.

On the other hand, each of the liquid crystal capsules 134 can include a capsule film 136 and liquid crystal molecules 138, and the capsule film 136 covers the liquid crystal molecules 138. Although in FIG. 1A, the liquid crystal capsule 134 is illustrated as a capsule film 136 covering one liquid crystal molecule 138, the present disclosure is not limited in this regard. In other embodiments, a capsule film 136 can cover more than one liquid crystal molecule 138.

The liquid crystal molecules 138 can be selected as a rod-shaped structure or a disk-shaped structure, in which the rod-shaped structure can be defined by a relationship between its biaxial refractive index, which is nz>nx=ny, and the disk-shaped structure can be defined by a relationship between its triaxial refractive index, which is nx=ny>nz. When the liquid crystal molecules 138 are selected to have a disc-shaped structure, a surface of the capsule film 136 is an optical thermal adhesive formed by a monomer having a stick-shaped structure, in which the stick-shaped structure can be defined by a relationship between its triaxial refractive index, which is nz>nx=ny, such that the structure of the capsule film 136 can match with that of the liquid crystal molecules 138 to present better optical properties, for example, the optical viewing angle can be increased. The birefringence difference, refractive index, triaxial refractive index, short axial refractive index, and long axial refractive index described in the foregoing embodiments are generally measured in the visible light band, and are unitless.

In addition, the display medium layer 130 further includes a surfactant 139, which is uniformly mixed and distributed in the filler 132. The surfactant 139 may include linear chain molecules, in which the structure of the linear chain molecules may have one end of hydrophilic group, such as a hydroxide ion group, and the other end of a hydrophobic group, such as an alkane group. In some embodiments, the surfactant 139 may at least include non-ionic surfactant, polyoxyethylene derivative, fatty alcohol polyvinyl ether derivative, or combinations thereof, in which the chemical formula of polyoxyethylene derivative is:

and the chemical formula of fatty alcohol polyvinyl ether derivative is

By adding the surfactant 139 into the display medium layer 130, the liquid crystal capsules 134 can be more uniformly mixed in the filler 132 to prevent the liquid crystal capsules 134 from clustering in a partial area of the filler 132. In some embodiments, the surfactant may further include Surfynol-104H, Surfynol-420, Surfynol-440, Surfynol SE-F, Dynal-360, Dynal-604, Pluronic-10R5, Plu-25R5, Pluronic F127, Pluronic-L44, or combinations thereof.

The spacers 140 can define more than one accommodation spaces between the first substrate 110 and the second substrate 150, thereby preventing the liquid crystal capsules 134 of the display medium layer 130 from moving and resulting in a nonuniform distribution. The second substrate 150 is disposed on the display medium layer 130 and has transparency and flexibility, for example, the second substrate 150 may be a polyimide substrate.

Figure 2A:
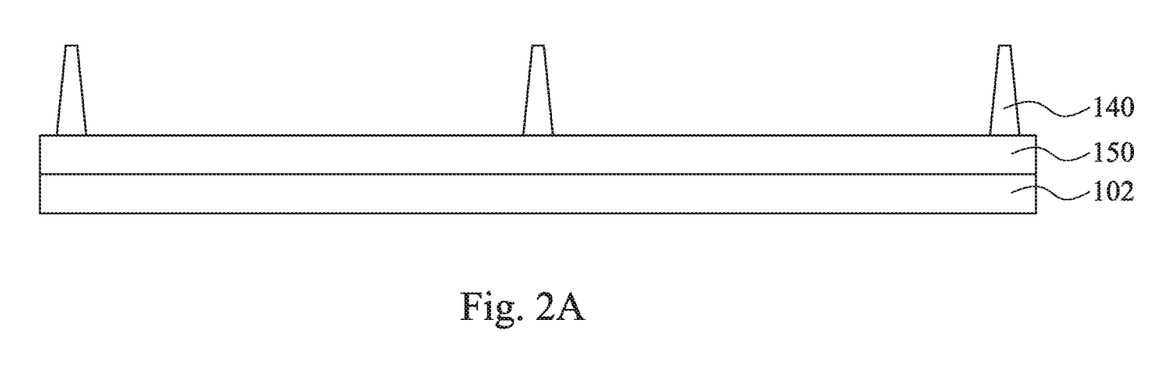
FIG. 2A to FIG. 2D are schematic side views of the display panel of FIG. 1A at different stages in the manufacturing process, respectively.

References are again made to FIG. 2A to FIG. 2D, which are schematic side views of the display panel 100A of FIG. 1A at different stages in the manufacturing process, respectively. As shown in FIG. 2A, a second substrate 150 can first be formed on a first carrier substrate 102, in which the first carrier substrate 102 may be a glass substrate. Next, spacers 140 can be formed on the second substrate 150, such that more than one accommodation spaces are defined on the second substrate 150 by the spacers 140. In addition, the spacers 140 may be formed in trapezoid shapes with respect to the second substrate 150.

Figure 2B:
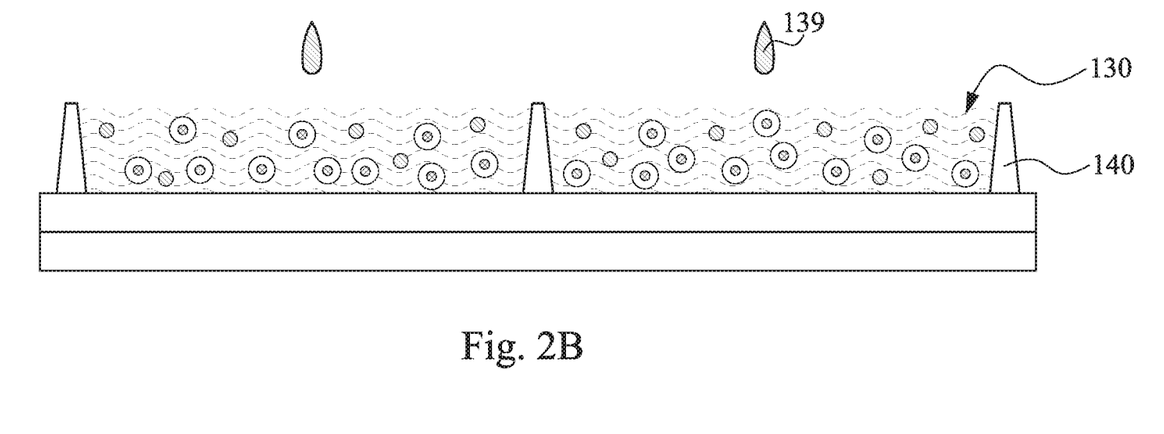

As shown in FIG. 2B, the display medium layer 130 can be filled in the accommodation spaces defined by the spacers 140 by, for example, a one drop fill (ODF) manner. In addition, at this stage, a surfactant 139 may be added into the display medium layer 130.

Figure 2C:
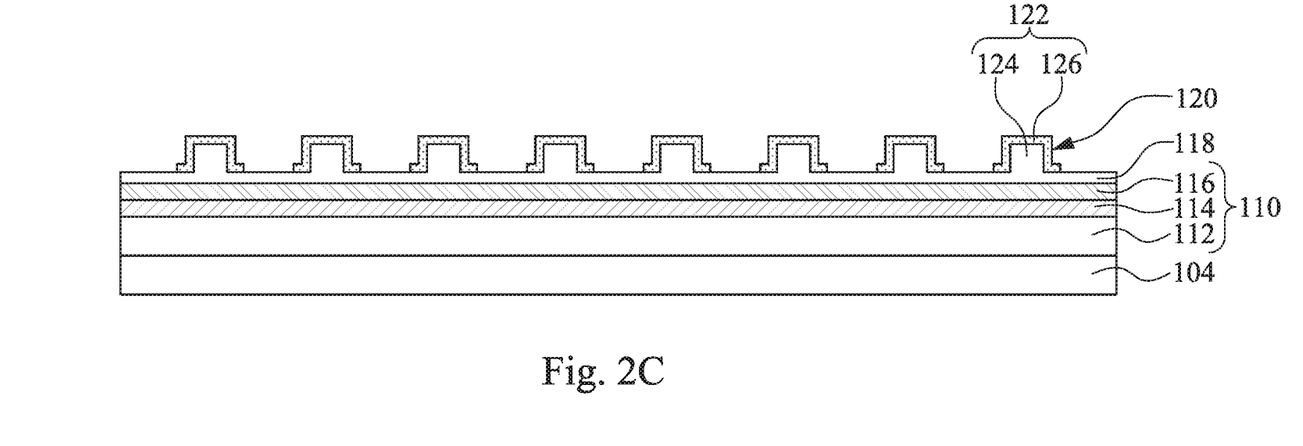

As shown in FIG. 2C, a first substrate 110 can be formed on a second carrier substrate 104, in which the second carrier substrate 104 may be a glass substrate, and the step of forming the first substrate 110 includes forming a transparent substrate 112, an array layer 114 and a color filter layer 116 sequentially. Next, a protective layer 118 and an electrode layer 120 may be formed on the color filter layer 116 sequentially, in which the electrode layer 120 is formed to include a plurality of stereoscopic electrodes 122, and the stereoscopic electrode 122 includes protruding structures 124 and electrode pads 126. As described above, the protective layer 118 and the protruding structure 124 can be formed simultaneously or sequentially, which will not be repeated hereinafter. After the protruding structures 124 are formed, contact holes (not shown) may be formed, such that the electrode pads 126 formed subsequently can be connected to the thin-film transistors of the array layer 114. The step of forming the electrode pad 126 may include a patterning process, for example, a conductive layer may be formed on the protective layer 118 and the protruding structures 124, and the conductive layer can be patterned by exposure and lithography to form electrode pads 126 as shown in FIG. 2C.

Figure 2D:
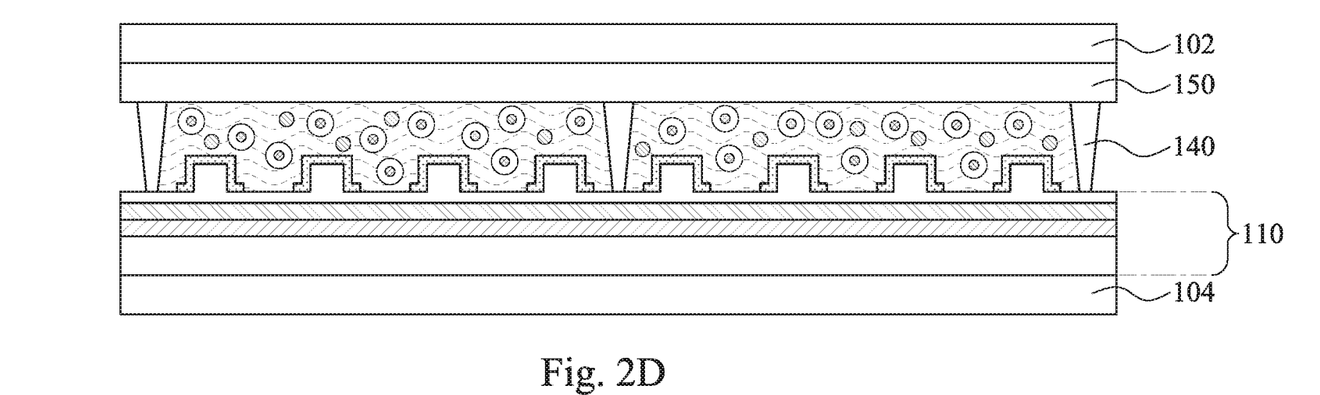

As shown in FIG. 2D, the structures shown in FIG. 2B and FIG. 2C can be assembled to form the structure of FIG. 2D, in which the second substrate 150 can be disposed on the first substrate 110, and the spacers 140 may be in inverted-trapezoid shapes with respect to the first substrate 110. In this regard, during the assembling, a sealant can be disposed on the periphery of the first substrate 110 or the second substrate 150, and the sealant can be heated or provided with light to be cured, so as to fix the second substrate 150 to the first substrate 110. In some embodiments, during the assembling, other adhesive, such as ultraviolet-curing adhesive, can also be coated on the top surface of the spacers 140 to increase the fixing strength of the second substrate 150 to the first substrate 110, and thus preventing the second substrate 150 from being separated from the first substrate 110. After the assembling is finished, the second carrier substrate 104 can be detached from the first substrate 110, and the first carrier substrate 102 can also be detached from the second substrate 150, so as to obtain a display panel 100A as shown in FIG. 1A. In addition, after the display panel 100A is obtained, polarizers (not shown) can be attached to the upper surface and the lower surface of the display panel 100A.

Figure 3A:
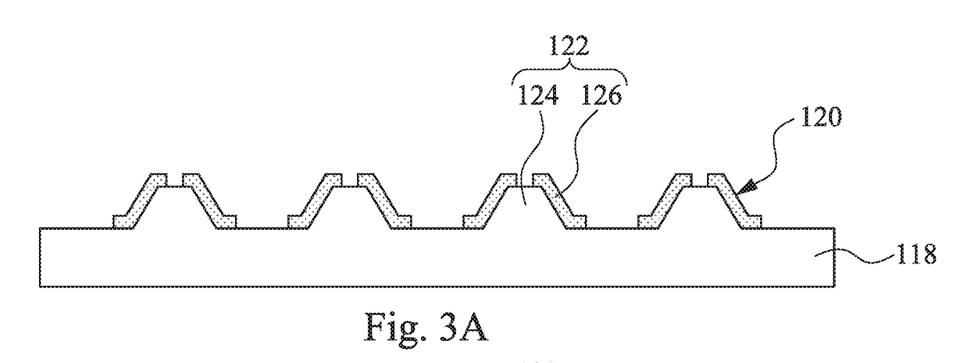
FIG. 3A to FIG. 3C are schematic side views of the electrode layer in different embodiments, respectively.
Figure 3B:
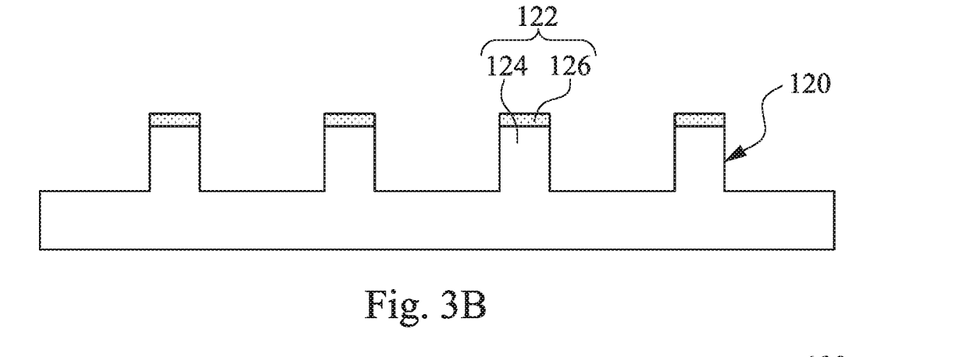
Figure 3C:
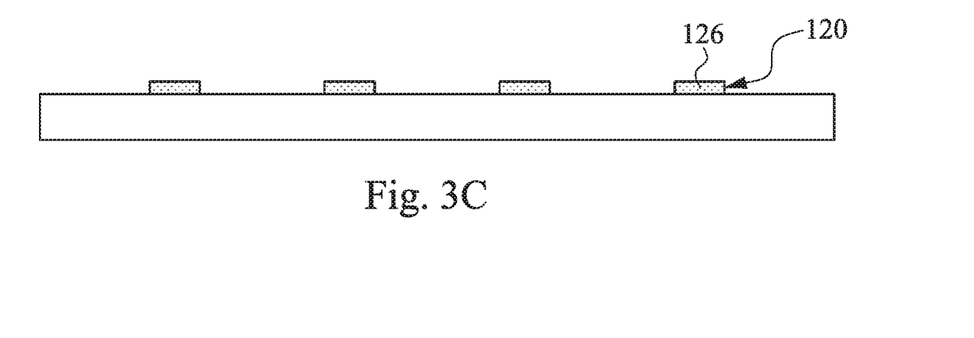

In the present disclosure, the stereoscopic electrodes of the aforementioned electrode layer can also be formed into other shapes, as shown in FIG. 3A to FIG. 3C, which are schematic side views of the electrode layer 120 in different embodiments.

As shown in FIG. 3A, in the electrode layer 120, the protruding structure 124 of the stereoscopic electrode 122 may be trapezoidal with respect to the protective layer 118, and two separated electrode pads 126 can be formed on each of the trapezoidal protruding structures 124. For two separated electrode pads 126 on each of the trapezoidal protruding structures 124, different voltages, such as a positive voltage and a negative voltage, can be applied thereto when the image is displayed on the display panel. As shown in FIG. 3B, in the electrode layer 120, the electrode pad 126 of the stereoscopic electrode 122 can be completely formed on the top surface of the protruding structure 124, that is, the electrode pad 126 does not extend to the sidewalls of the protruding structure 124. For each pair of the adjacent electrode pads 126, different voltages, such as a positive voltage and a negative voltage, can be applied thereto when the image is displayed on the display panel.

However, the present disclosure is not limited in this regard. In some embodiments, the electrode layer 120 can also omit the protruding structure, such that the electrode pad 126 is formed on a planar layer, as shown in FIG. 3C. For each pair of the adjacent e a pads 126, different voltages, such as a positive voltage and a negative voltage, can be applied thereto when the image is displayed on the display panel.

Figure 4:
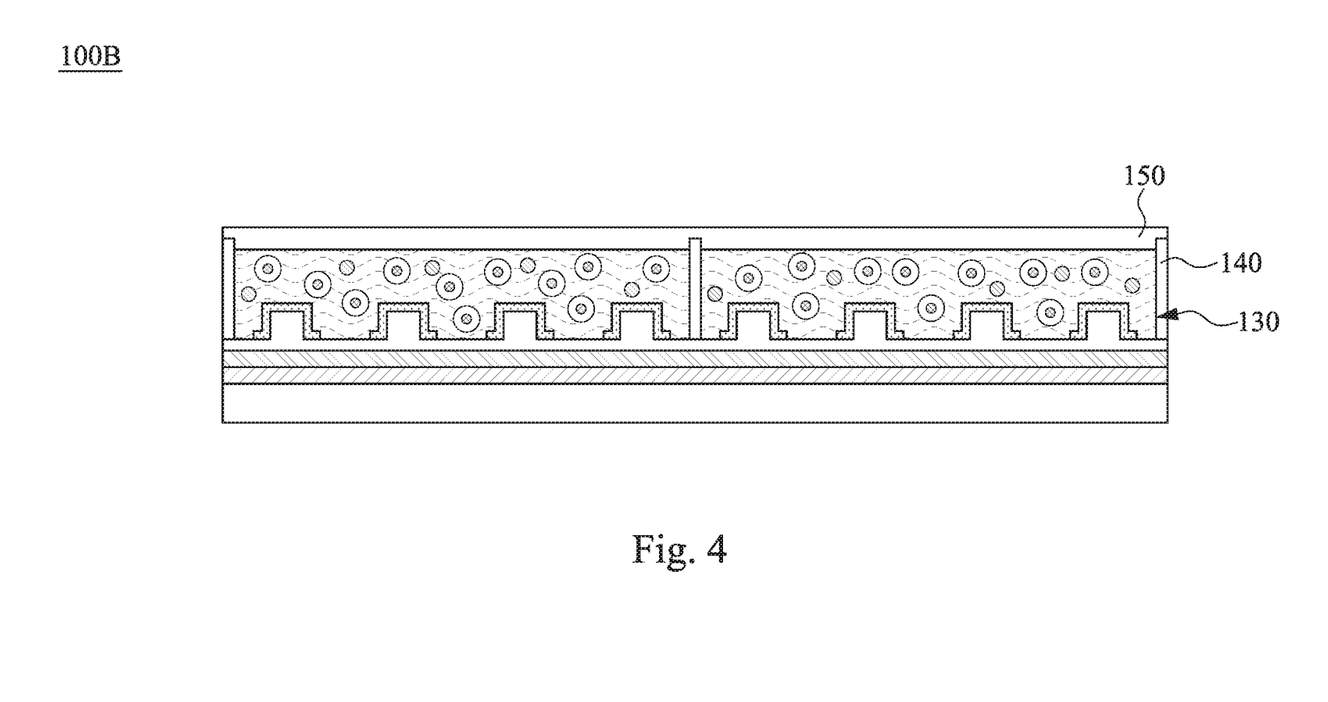
FIG. 4 is a schematic side view of a display panel according to a second embodiment of the present disclosure.

Reference is made to FIG. 4. FIG. 4 is a schematic side view of a display panel 100B according to a second embodiment of the present disclosure. At least one difference t n the present embodiment and the first embodiment is that the second substrate 150 of the present embodiment is formed by curing a monomer which is added into the display medium layer 130, thereby omitting the assembling process.

Specifically, before curing, the second substrate 150 may be the monomer which is uniformly mixed in the display medium layer 130. After phase separation, the monomer can be suspended on the liquid surface of the display medium layer 130. Next, after the monomer is cured, the second substrate 150 is formed. Since the second substrate 150 is formed by curing the liquid surface of the display medium layer 130, the cured second substrate 150 not only covers the spacer 140 and the display medium layer 130, but also at least a portion of the cured second substrate 150 is disposed between the spacers 140. Such a configuration can omit the disposition of an additional substrate, thereby improving the flexibility or the degree of flexibility of the display panel 100B.

References are made to FIG. 5A to FIG. 5D, which are schematic side views of the display panel 100B of FIG. 4 at different stages in the manufacturing process, respectively.

Figure 5A:
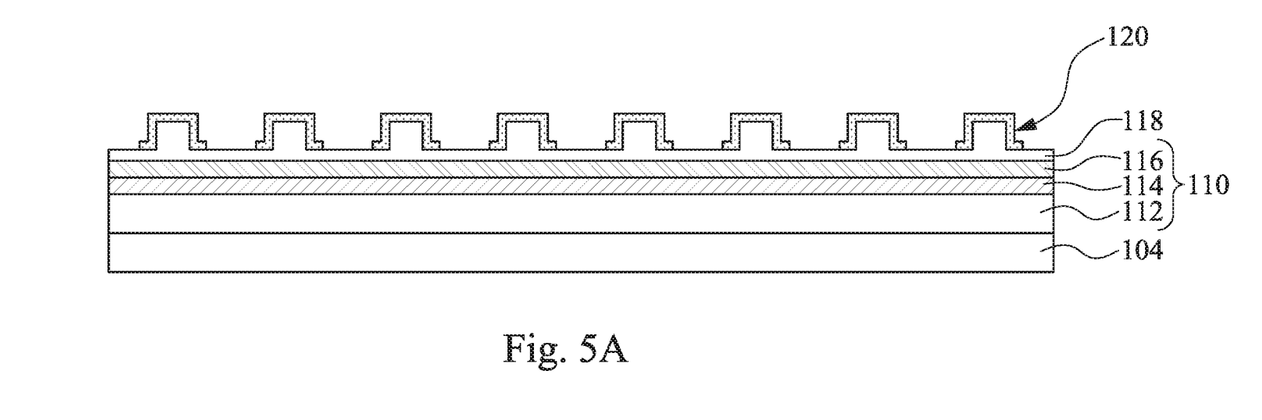
FIG. 5A to FIG. 5D are schematic side views of the display panel of FIG. 4 at different stages in the manufacturing process, respectively.

As shown in FIG. 5A, the transparent substrate 112, the array layer 114, and the color filter layer 116 of the first substrate 110 can be formed on the second carrier substrate 104 sequentially, and the protective layer 118 and the electrode layer 120 are formed on the color filter layer 116 sequentially. These steps may be the same as the stages illustrated in FIG. 2A, and will not be repeated hereinafter.

Figure 5B:
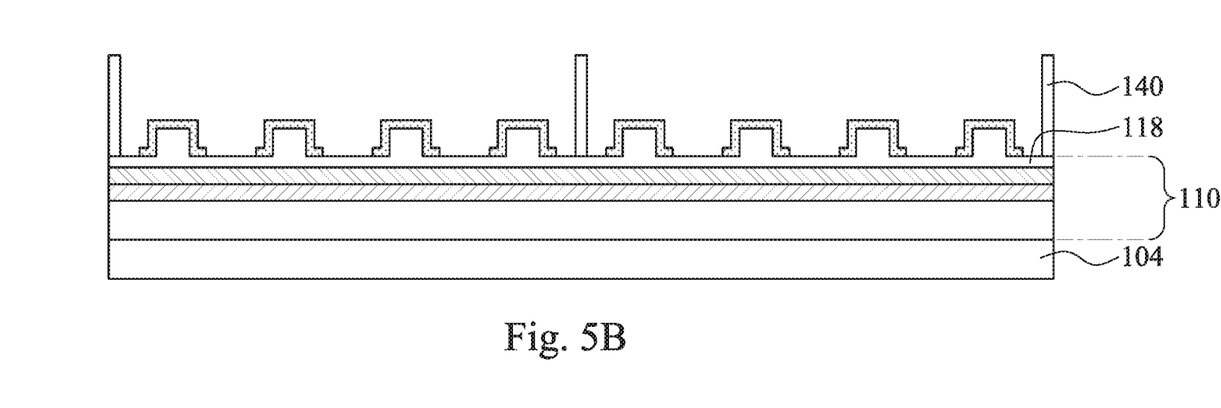

As shown in FIG. 5B, spacers 140 can be formed on the protective layer 118, such that more than one accommodation space is defined on the first substrate 110 by the spacers 140, in which the spacers 140 can be formed by performing the mask process or imprinting microstructures. In addition, although the spacers 140 are illustrated as bars standing upright on the protective layer 118 in the present embodiment, the present disclosure is not limited in this regard. In other embodiments, the spacers 140 of FIG. 5B can also be formed as the trapezoidal spacers as described above.

Figure 5C:
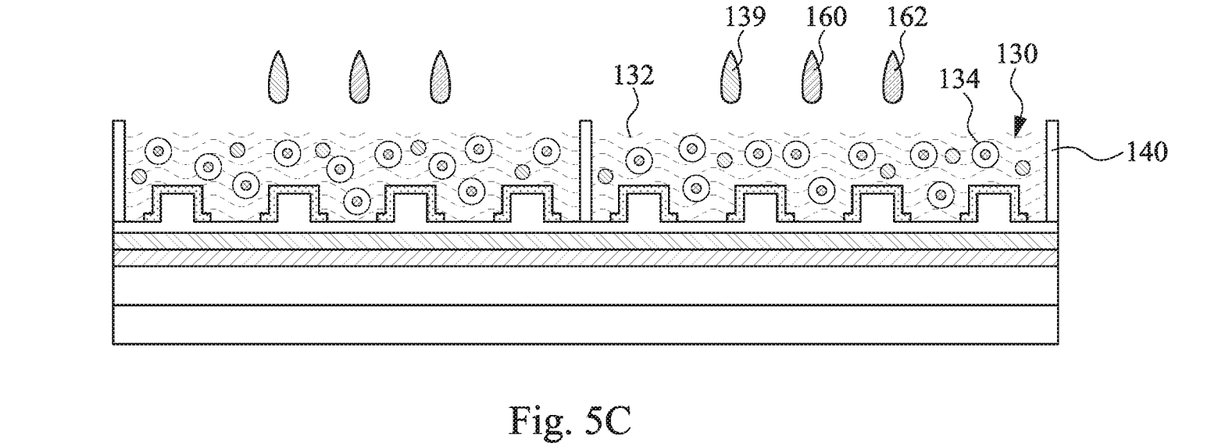

As shown in FIG. 5C, the filler 132, the liquid crystal capsule 134, the surfactant 139, the photo initiator 160, and the monomer 162 can be uniformly mixed, such that the liquid crystal capsule 134 and the surfactant 139, the photo initiator 160, and the monomer 162 can be distributed in the filler 132 to form the display medium layer 130, in which the display medium layer 130 is filled in the accommodation space defined by the spacers 140, which can be achieved by one drop fill (ODF) manner.

Specifically, the photo initiator 160 may include oxyphenone, benzophenone, benzotriazole, boron carbazole derivative, phenylcarbazole derivative, 1-hydroxycyclohexylphenyl ketone, substance capable of absorbing infrared light, such as H-Nu-IR 780, H-Nu-IR 815, or combinations thereof purchased from Spectra group limited incorporation, in which the chemical formula of H-Nu-IR 780 is -continued and the chemical formula of H-Nu-IR 815 is

However, the present disclosure is not limited in this regard. In other embodiments, the photo initiator 160 may include substance capable of absorbing ultraviolet light, or combinations of substance capable of absorbing infrared light and substance capable of absorbing ultraviolet light. The substance capable of absorbing ultraviolet light may be, for example, Ciba Product IRGANOX1 1076, IRGACURE 651, or combinations thereof. In addition, the addition ratio of the light initiator 160 may be from 0.1% to 1%. The ratio % in the aforementioned embodiment is preferably taken a weight percentage (wt. %) as an example.

The monomer 162 may be a single acrylic functional group or a multi-acrylic functional group, such as an acrylic ester group or an acrylic methyl ester, in which the chemical formula of the acrylic ester group is:

and the chemical formula of acrylic methyl ester is:

in which the "X" in the chemical formula can be a single bond, a triple bond, a double bond, or a bond such as —O—, —COO—, —OCO—, —O—CO—O—, or —CH$_2$O, the "Y" in the chemical formula may be a bond such as —(CH$_2$)$_n$, and the value of n is an integer between 0 and 12, and the terminal group "R" in the chemical formula may be a polymerizable unit, such as acrylic acid, methacrylic acid, butylene oxide, vinyl epoxy, vinyl, vinyloxy, allyl ether, a bond such as —O—CO—CH=CH or styrene.

In addition to using the aforementioned chemical formula as the monomer 162, a disk-shaped or a stick-shaped monomer 162 can also be used. For example, the disc-shaped monomer 162 may be hexayne benzene acrylic molecule, hexamethylene methyl acrylic molecule, hexabenzoic acid acrylic molecule, hexaphenyl ether acrylic molecule or 2-naphthyl methyl ether acrylic molecule, for example, the chemical formula may be where in the "X" in the chemical formula may be a single bond or such as —O—, —COO—, —OCO—, —C≡C—, —O—CO—O—, or —CH$_2$O, the "Y" in the chemical formula can be a bond such as —(CH$_2$)$_n$, and the value of n is an integer between 0 and 12, and the terminal group "R" in the chemical formula can be a polymerizable unit, such as acrylic acid, methacrylic acid, butylene oxide, vinyl epoxy, vinyl, vinyloxy, propenyl ether, a bond such as —O—CO—CH=CH or styrene family. The stick-shaped monomer 162 may be an acrylic acetylene benzoate, in which the chemical formula may be in which the "X" in the chemical formula may be a single bond, a triple bond, a double bond, or such as —O—, —COO—, —OCO—, —O—CO—O—, or —CH$_2$O, the "Y" in the chemical formula can be a bond such as —(CH$_2$)$_n$, in which the value of n is an integer between 0 and 12, and each of the values "m" and "p" in the chemical formula can be a positive integer between 1 and 12, the terminal group "R" in the chemical formula can be a polymerizable unit, such as acrylic acid, methacrylic acid, butylene oxide, epoxy vinyl, vinyl, vinyloxy, propenyl ether, a bond such as —O—CO—CH=CH or styrenic group, and the terminal group "R'" in the chemical formula may be hydrogen, halogen, an alkyl group having 1 to 20 carbon atoms, or combinations thereof, and in the terminal group "R'", at least one of —CH$_2$— may be replaced by a bond such as —O—, —S—, —CH=CH—, —CN, and the hydrogen thereof may be substituted with fluorine. Moreover, at this stage, the surfactant 139 can be added into the display medium layer 130 such that the liquid crystal capsules 134 of the display medium layer 130 can be more uniformly mixed in the filler 132.

Figure 5D:
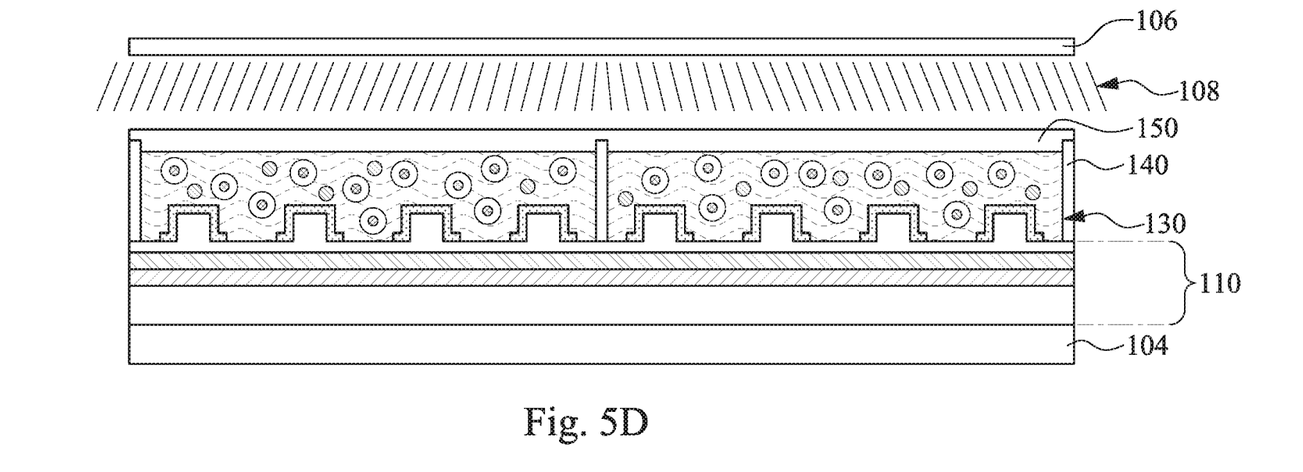

As shown in FIG. 5D, the display medium layer 130 can be irradiated with light 108 by using an irradiator 106, and the wave band of the light 108 can be selected as infrared light band or ultraviolet light band according to the characteristic of the light initiator (light initiator 160 of FIG. 5C). After the display medium layer 130 is irradiated with the light 108, the photo initiator (the photo initiators 160 and 162 in FIG. 5C) and the monomer can move to the liquid surface of the display medium layer 130 by their characteristics after the phase separation. Next, after the photo initiator is irradiated with the light 108 of the corresponding wave band, it can react to form the second substrate 150. After the second substrate 150 is formed, the second carrier substrate 104 can be detached from the first substrate 110 to obtain the display panel 100B as shown in FIG. 4. In addition, after the display panel 100B is obtained, the polarizers (not shown) can be attached to the upper surface and the lower surface of the display panel 100B.

In summary, the display panel of the present disclosure includes a first substrate, an electrode layer, and a display medium layer, in which the electrode layer is disposed on the first substrate and the display medium layer is disposed on the electrode layer. The display medium layer includes a filler and liquid crystal capsules, in which the liquid crystal capsules are distributed in the filler, and the birefringence difference Δn of the filler is in a range from 0.02 to 0.175. The filler with such a birefringence difference Δn can be achieved by adjusting its material configuration. By adjusting the birefringence difference Δn of the filler to be in a range from 0.02 to 0.175, the birefringence difference Δn of the filler can be matched to the refractive index of the electrode layer, thereby avoiding light leakage of the display panel in a dark state so as to increase the contrast of the display panel. Moreover, the display panel of the present disclosure is flexible, and in a case where the display panel includes a configuration of color filter on array, the flexibility can further be enhanced.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A display panel, comprising:
    a first substrate;
    an electrode layer disposed on the first substrate; and
    a display medium layer disposed on the electrode layer, and comprising a filler and a plurality of liquid crystal capsules, wherein the liquid crystal capsules are distributed in the filler, and the filler has a birefringence difference $\Delta n$ in a range from 0.02 to 0.175,
    wherein the electrode layer comprises a plurality of stereoscopic electrodes, and each of the stereoscopic electrodes comprises:
        a protruding structure, protruding from the first substrate toward the display medium layer; and
        an electrode pad, disposed on the protruding structure, wherein a thickness of the electrode pad is in a range from 300 nm to 700 nm.

2. The display panel of claim 1, further comprising a second substrate disposed on the display medium layer, wherein each of the first substrate and the second substrate are flexible.

3. The display panel of claim 2, further comprising a plurality of spacers disposed between the first substrate and the second substrate, wherein the second substrate is formed by curing at least one monomer added into the display medium layer, and at least a portion of the cured second substrate is disposed between the spacers.

4. The display panel of claim 1, wherein each of the liquid crystal capsules comprises a capsule film and at least one liquid crystal molecule, and the capsule film covers the liquid crystal molecule, wherein the liquid crystal molecule is a rod-shaped structure or a disc-shaped structure.

5. The display panel of claim 4, wherein the liquid crystal molecule is the disc-shaped structure, and the capsule film is an optical thermal adhesive formed of at least one monomer having a stick-shaped structure.

6. The display panel of claim 1, wherein the first substrate comprises a transparent substrate, an array layer, and a color filter layer, the transparent substrate is flexible, and the array layer is disposed between the transparent substrate and the color filter layer.

7. The display panel of claim 1, wherein a short axial refractive index $n\perp$ of the filler is in a range from 1.45 to 1.5, and a long axial refractive index $n\|$ is in a range from 1.5 to 1.55.

* * * * *